Patented Aug. 14, 1923.

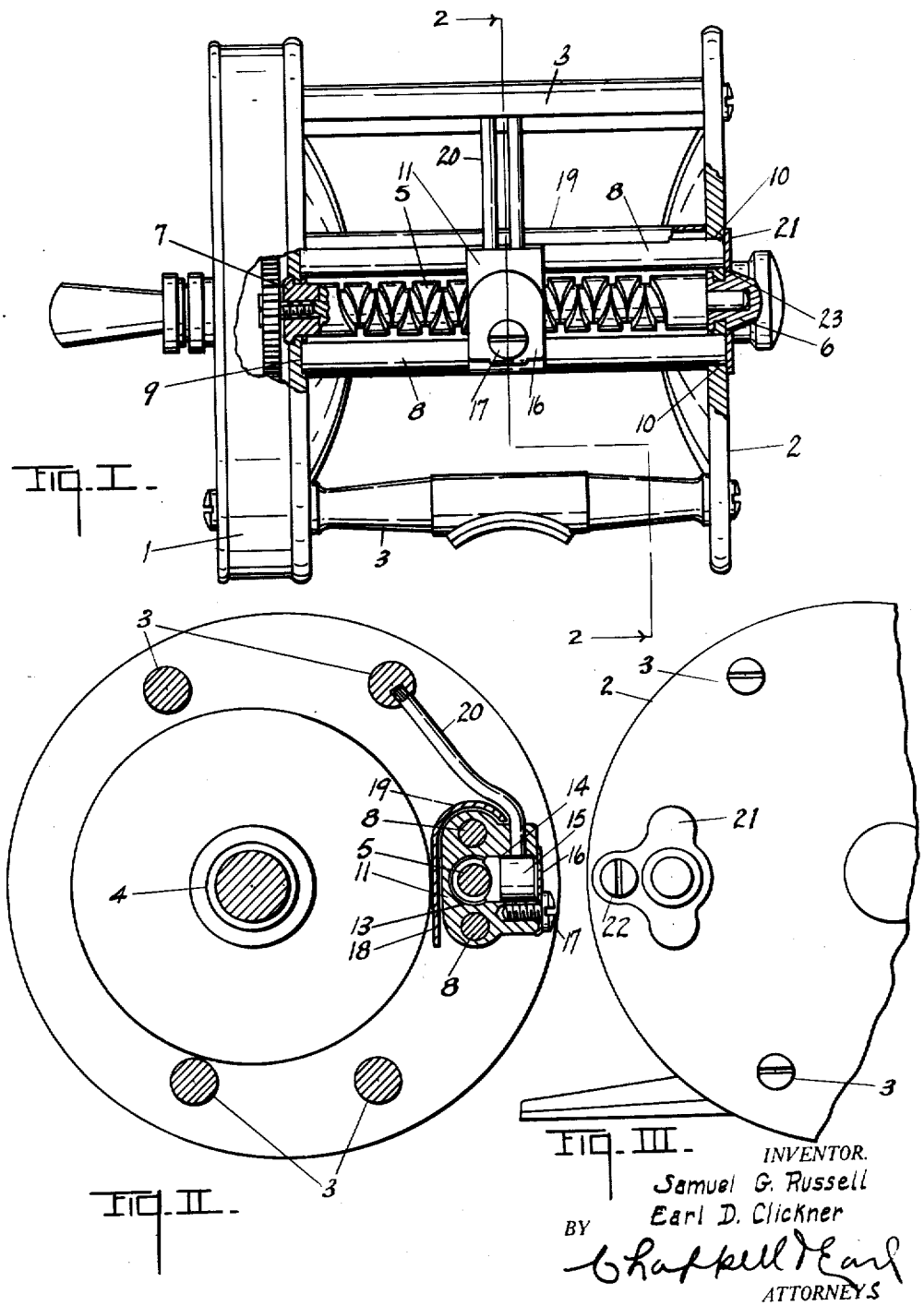

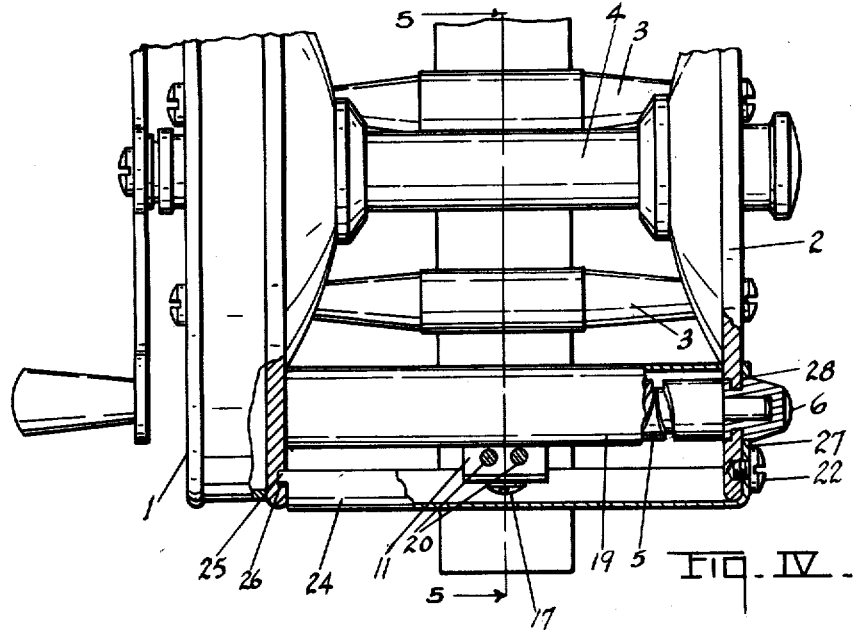
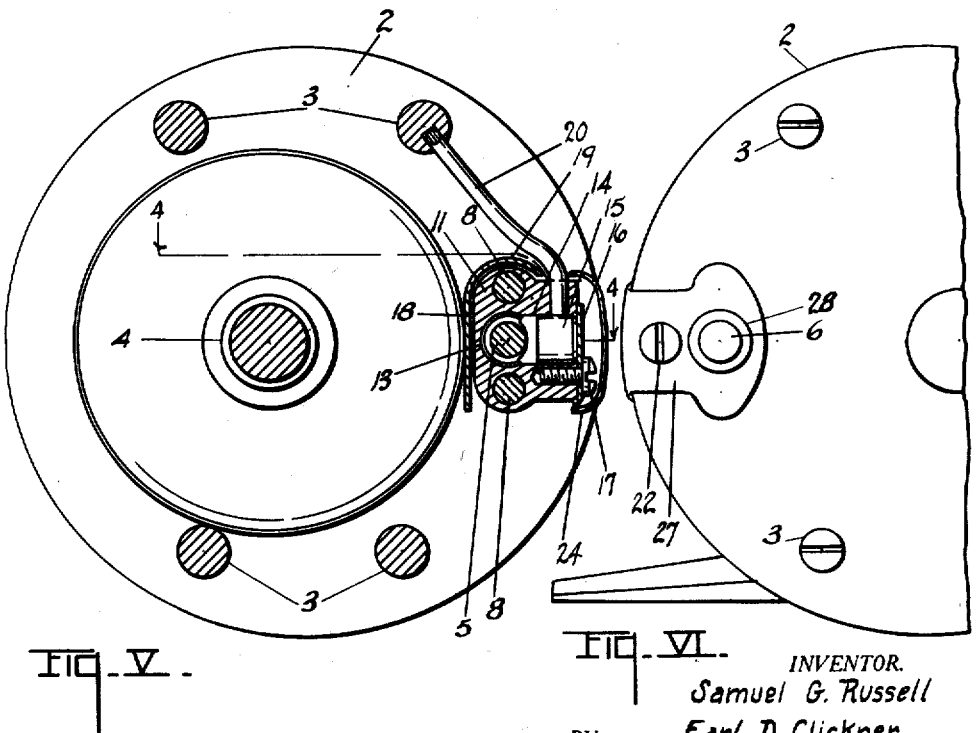

1,464,587

UNITED STATES PATENT OFFICE.

SAMUEL G. RUSSELL AND EARLE D. CLICKNER, OF KALAMAZOO, MICHIGAN, ASSIGNORS TO SHAKESPEARE COMPANY, OF KALAMAZOO, MICHIGAN.

FISHING REEL.

Application filed August 11, 1922. Serial No. 581,060.

*To all whom it may concern:*

Be it known that we, SAMUEL G. RUSSELL and EARLE D. CLICKNER, citizens of the United States, residing at the city and county of Kalamazoo, State of Michigan, have invented certain new and useful Improvements in Fishing Reels, of which the following is a specification.

This invention relates to improvements in fishing reels.

The main objects of the invention are:

First, to provide an improved fishing reel of the level wind type in which the line guide carriage is supported for free sliding movement with a minimum amount of binding action and wear upon the traversing shaft.

Second, to provide an improved fishing reel having these advantages in which the parts are very economical in structure and easily assembled.

Third, to provide an improved fishing reel of the level wind type in which the moving parts are effectively guarded.

Further objects, and objects relating to structural details, will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing, forming a part of this application, in which:

Fig. I is a front view of our improved fishing reel, parts being sectioned and broken away to show structural details.

Fig. II is a transverse section on a line corresponding to the broken line 2—2 of Fig. I.

Fig. III is a fragmentary elevation of the tail end of the reel.

Fig. IV is a fragmentary plan view partially in section on a line corresponding to line 4—4 of Fig. V of a modified form or embodiment of our invention.

Fig. V is a vertical section on a line corresponding to line 5—5 of Fig. IV.

Fig. VI is a fragmentary elevation of the tail end of the embodiment shown in Fig. IV.

In the drawing similar reference characters refer to similar parts throughout the several views, and the sectional views are taken looking in the direction of the little arrows at the ends of the section lines.

Referring to the drawing, the frame of the reel in the embodiment illustrated comprises a chambered head member 1 and plate-like tail member 2 connected by suitable pillars 3. The spool 4 is preferably disposed eccentrically of the reel as is shown in the drawings. A traversing shaft 5 of the double thread type is provided with a bearing 6 on the tail member and with a bearing 7 on the head member.

Carriage slide rods 8 are disposed parallel with and at each side of the traversing shaft, the head member being provided with sockets 9 adapted to receive these guiding rods and the tail member having openings 10 therein through which the guide rods may be introduced to the sockets. In practice it is desirable that these guide rods be formed of very hard material and it is difficult to machine the guide rods to provide shoulders or fittings adapted to engage the head and tail plates as has been the practice heretofor. By forming the openings in the tail plate permitting the introduction of the rods, rods of uniform diameter from end to end may be employed and such rods of proper caliber and of perfect finish are on the market, so that all that is necessary to do is to cut them off or they can be easily manufactured.

The line guide carriage 11 is provided with openings 13 adapted to receive the traversing shaft. The carriage has a socket 14 open at the outer side of the carriage to receive the pawl 15. This pawl is retained in the socket by means of the plate 16, the plate being detachably retained by the screw 17. A housing 18 is arranged at the inner side of the carriage and has a top portion 19 overhanging the slide rods and traversing screw. The line guide 20 projects upwardly at the front of this housing. A retaining member 21 is secured to the tail plate by means of the screw 22 to overlap the openings 10, thereby retaining the slide rods. This plate has an opening 23 therein engaging the bearing 6, so that the bearing constitutes a supporting member for the retaining member.

In the modification shown in Figs. IV, V and VI we provide a channel-shaped guard plate 24 disposed in front of the carriage to embrace the same as illustrated. This guard is provided with a lug 25 engaging a recess 26 in the head member and has an extension 27 at its tail member end overlapping the tail member and performing the functions of the retaining member 21, it being adapted to overlap the openings 10 and being provided with an opening 28 receiving the bearing 6. A screw 22 serves to hold it in place, thereby effectively supporting the guard and also retaining the slide rods. Other modifications and adaptations will no doubt suggest themselves to those skilled in the art to which our invention relates.

Having thus described our invention, what we claim as new and desire to secure by Letters Patent, is:

1. In a fishing reel, the combination with a frame comprising head and tail members and connecting pillars therefor, of a spool, a traversing shaft, carriage slide rods disposed parallel to the said traversing shaft, said head member having sockets adapted to receive said slide rods and said tail member having openings through which said carriage slide rods may be introduced to said sockets, a line guide carriage slidable on said rods, said carriage having openings through which said rods may be introduced longitudinally and being provided with an outwardly facing pawl socket, a pawl disposed in said socket to coact with said shaft, a retaining plate secured to the outer side of said carriage, a housing for said traversing shaft and guide rods disposed at the inner side thereof and having a top portion overhanging the same, a line guide member on said carriage projecting upwardly at the front of said housing, a channel-shaped guard embracing the front of the carriage and having a lug at its head member end engaging a recess in said head and a lateral extension at its tail member end overlapping the tail member and covering said slide rod openings thereof, and a screw securing said extension to said tail member.

2. In a fishing reel, the combination with a frame comprising head and tail members and connecting pillars therefor, of a spool, a traversing shaft, carriage slide rods disposed parallel to the said traversing shaft, said head member having sockets adapted to receive said slide rods and said tail member having openings through which said carriage slide rods may be introduced to said sockets, a line guide carriage slidable on said rods, said carriage having openings through which said rods may be introduced longtudinally, a housing for said traversing shaft and guide rods disposed at the inner side thereof and having a top portion overhanging the same, a line guide member on said carriage projecting upwardly at the front of said housing, a channel-shaped guard embracing the front of the carriage and having a lug at its head member end engaging a recess in said head and a lateral extension at its tail member end overlapping the tail member and covering said slide rod openings thereof.

3. In a fishing reel, the combination with a frame comprising head and tail members and connecting pillars therefor, of a spool, a traversing shaft, carriage slide rods disposed parallel to the said traversing shaft, said head member having sockets adapted to receive said slide rods and said tail member having openings through which said carriage slide rods may be introduced to said sockets, a line guide carriage slidable on said rods, said carriage having openings through which said rods may be introduced longitudinally, and being provided with an outwardly facing pawl socket, a pawl disposed in said socket to coact with said shaft, a retaining plate secured to the outer side of said carriage, a line guide member on said carriage, a guard at the front of the carriage having a lug at its head member end engaging a recess in said head and a lateral extension at its tail member end overlapping the tail member and covering said slide rod openings thereof.

4. In a fishing reel, the combination with a frame comprising head and tail members and connecting pillars therefor, of a spool, a traversing shaft, carriage slide rods disposed parallel to the said traversing shaft, said head member having sockets adapted to receive said slide rods and said tail member having openings through which said carriage slide rods may be introduced to said sockets, a line guide carriage slidable on said rods, said carirage having openings through which said rods may be introduced longitudinally, a line guide member on said carriage, a guard at the front of the carriage having a lug at its head member end engaging a recess in said head and a lateral extension at its tail member end overlapping the tail member and covering said slide rod openings therefor.

5. In a fishing reel, the combination with a frame comprising head and tail members and connecting pillars therefor, of a spool, a traversing shaft, carriage slide rods disposed parallel to the said traversing shaft, said head member having sockets adapted to receive said slide rods and said tail member having openings through which said carriage slide rods may be introduced to engage said sockets, a line guide carriage slidable on said rods and provided with a pawl coacting with said shaft, a housing for said traversing shaft and guide rods disposed at the inner side thereof and having a top portion overhanging the same, a line guide member on said carriage projecting upwardly at the front of said housing, and a guard disposed at the front of the carriage and having a lateral extension overlapping the tail member and covering said slide rod openings thereof.

6. In a fishing reel, the combination with a frame comprising head and tail members and connecting pillars therefor, of a spool, a traversing shaft, carriage slide rods disposed parallel to the said traversing shaft, said head member having sockets adapted to receive said slide rods and said tail member having openings through which said carriage slide rods may be introduced to engage said sockets, a line guide carriage slidable on said rods and provided with a pawl coacting with said shaft, a line guide member on said carriage, and a guard disposed at the front of the carriage and having a lateral extension overlapping the tail member and covering said slide rod openings thereof.

7. In a fishing reel, the combination with a frame comprising head and tail members and connecting pillars therefor, of a spool, a traversing shaft, carriage slide rods disposed parallel to the said traversing shaft, said head member having sockets adapted to receive said slide rods and said tail member having openings through which said carriage slide rods may be introduced to engage said sockets, a line guide carriage slidable on said rods, said carriage having openings through which said rods may be introduced longitudinally and being provided with a pawl, and a retaining member for said slide rods secured to said tail member.

8. In a fishing reel, the combination with a frame comprising head and tail members and connecting pillars therefor, of a spool, a traversing shaft, carriage slide rods disposed parallel to the said traversing shaft, said head member having sockets adapted to receive said slide rods and said tail member having openings through which said carriage slide rods may be introduced to engage said sockets, a line guide carriage slidable on said rods and provided with a pawl, and a retaining member for said slide rods secured to said tail member.

9. In a fishing reel, the combination with a frame comprising head and tail members and connecting pillars therefor, a spool, a traversing shaft, a carriage slide rod disposed parallel to said traversing shaft, said head member having a socket for said slide rod, said tail member having an opening through which said slide rod may be introduced to said socket, a line guide carriage slidable on said rod and provided with a pawl coacting with said shaft, a housing for said shaft and guide rod disposed at the inner side thereof and having a top portion overhanging the same, a line guide member on said carriage projecting upwardly at the front of the housing, a channel-shaped guard disposed at the front of the carriage and having a lug at its head member end engaging a recess in said head and a lateral extension at its tail member end overlapping the tail member and secured thereto to cover said slide rod opening thereof.

10. In a fishing reel, the combination with a frame comprising head and tail members and connecting pillars therefor, of a spool, a traversing shaft, a carriage slide rod disposed parallel to said traversing shaft, said head member having a socket for said slide rod, said tail member having an opening through which said slide rod may be introduced to said socket, a line guide carriage slidable on said rod provided with a pawl coacting with said shaft, a line guide member on said carriage, and a channel-shaped guard disposed at the front of the carriage and having a lug at its head member end engaging a recess in said head and a lateral extension at its tail member end overlapping the tail member and secured thereto to cover said slide rod opening thereof.

11. In a fishing reel, the combination with a frame comprising head and tail members and connecting pillars therefor, of a spool, a traversing shaft, a carriage slide rod disposed parallel to said traversing shaft, said head member having a socket for said slide rod, said tail member having an opening through which said slide rod may be introduced to said socket, a line guide carriage slidable on said rod and provided with a pawl coacting with said shaft, a line guide member on said carriage, and a retaining member for said rod secured to said tail member.

12. In a fishing reel, the combination with a frame comprising a tail member having a projecting traversing shaft bearing thereon and an opening therein through which a carriage slide rod may be introduced, a traversing shaft disposed in said bearing, a carriage slide rod disposed in said opening, a line guide carriage slidable on said rod, and a retaining member for said rod secured to said tail member to overlap said opening thereof and having an opening engaging said bearing whereby the bearing constitutes a supporting member therefor.

13. In a fishing reel, the combination with a frame comprising a tail member having a traversing shaft bearing thereon and an opening therein through which a carriage slide rod may be introduced, a traversing shaft disposed in said bearing, a carriage slide rod disposed in said opening, a line guide carriage slidable on said rod and having an opening through which said rod may be introduced longitudinally and provided with a pawl coacting with said shaft, and a retaining member for said rod secured to said tail member to overlap said opening thereof.

14. In a fishing reel, the combination with a frame comprising a tail member having a traversing shaft bearing thereon and an opening therein through which a carriage slide rod may be introduced, a traversing shaft disposed in said bearing, a carriage slide rod disposed in said opening, a line guide carriage slidable on said rod and provided with a pawl coacting with said shaft, and a retaining member for said rod secured to said tail member to overlap said opening thereof.

In witness whereof, we have hereunto set our hands and seals.

SAMUEL G. RUSSELL. [L. S.]
EARLE D. CLICKNER. [L. S.]